US009272844B2

(12) United States Patent
Yoshioka

(10) Patent No.: US 9,272,844 B2
(45) Date of Patent: Mar. 1, 2016

(54) VERTICALLY MOVING DEVICE

(75) Inventor: Hideo Yoshioka, Higashiomi (JP)

(73) Assignee: Daifuku Co., Ltd., Osaka-shi (JP)

( * ) Notice: Subject to any disclaimer, the term of this patent is extended or adjusted under 35 U.S.C. 154(b) by 200 days.

(21) Appl. No.: 13/143,489

(22) PCT Filed: Jan. 8, 2009

(86) PCT No.: PCT/JP2009/050141
§ 371 (c)(1),
(2), (4) Date: Sep. 13, 2011

(87) PCT Pub. No.: WO2010/079603
PCT Pub. Date: Jul. 15, 2010

(65) Prior Publication Data
US 2011/0315488 A1    Dec. 29, 2011

(51) Int. Cl.
| | | |
|---|---|---|
| B66B 11/00 | (2006.01) | |
| B66B 11/06 | (2006.01) | |
| B65G 1/02 | (2006.01) | |
| B66F 7/02 | (2006.01) | |

(52) U.S. Cl.
CPC .............. *B65G 1/02* (2013.01); *B66B 11/0075* (2013.01); *B66F 7/02* (2013.01); *B65G 2201/0297* (2013.01)

(58) Field of Classification Search
CPC ........ B66B 9/00; B66B 9/16; B66B 11/0075; B66F 9/07; B66F 11/04; B65G 1/02
USPC .......... 187/259, 261–263; 182/142, 144, 150; 414/218
IPC ................ B66B 11/00, 11/06; E04G 3/32, 1/18
See application file for complete search history.

(56) References Cited

U.S. PATENT DOCUMENTS

| | | | | | |
|---|---|---|---|---|---|
| 125,978 | A | * | 4/1872 | Neal | 254/285 |
| 449,026 | A | * | 3/1891 | Anderson | 187/243 |
| 588,982 | A | * | 8/1897 | Gray | 182/129 |
| 601,963 | A | * | 4/1898 | Hoffman | 187/263 |
| 925,727 | A | * | 6/1909 | Rowe | 62/260 |
| 1,006,044 | A | * | 10/1911 | Barlow | 414/137.5 |
| 1,086,469 | A | * | 2/1914 | Schoenfeld | 187/401 |
| 1,678,528 | A | * | 7/1928 | Perin | 187/262 |
| 1,710,442 | A | | 4/1929 | Warshaw | |
| 2,420,903 | A | * | 5/1947 | Noble | 182/144 |
| 3,008,590 | A | * | 11/1961 | Alimanestiano | 414/240 |
| 3,051,335 | A | * | 8/1962 | Bartlett | 414/545 |

(Continued)

FOREIGN PATENT DOCUMENTS

| | | |
|---|---|---|
| DE | 3246191 A1 | 6/1984 |
| EP | 0292075 A1 | 11/1988 |

(Continued)

*Primary Examiner* — William E Dondero
*Assistant Examiner* — Minh Truong
(74) *Attorney, Agent, or Firm* — The Webb Law Firm

(57) ABSTRACT

A vertically moving device includes a spool mechanism for spooling at least two wires that are fed out to form loops and a vertically movable platform suspended by looped portions of the at least two wires fed out from the spool mechanism. The vertically movable platform includes at least four wire-guiding rotating bodies over which the looped portions of the wires are run. And a looped portion of one of the wires is run over at least two of the wire-guiding rotating bodies, and a looped portion of the other of the wires is run over at least two other of the wire-guiding rotating bodies

10 Claims, 13 Drawing Sheets

(56) References Cited

U.S. PATENT DOCUMENTS

| | | | |
|---|---|---|---|
| 3,081,884 A * | 3/1963 | Minty | 212/274 |
| 3,211,259 A * | 10/1965 | Tofanelli | 187/408 |
| 3,463,271 A * | 8/1969 | St. Louis | 187/259 |
| 3,565,217 A * | 2/1971 | St. Louis | 187/256 |
| 3,653,518 A * | 4/1972 | Polen | 212/330 |
| 3,746,182 A | 7/1973 | Tax et al. | |
| 3,828,940 A * | 8/1974 | Cooper | 212/308 |
| 3,837,503 A * | 9/1974 | Komatsu | 212/83 |
| 3,900,114 A * | 8/1975 | Inoue et al. | 212/83 |
| 4,901,471 A | 2/1990 | van den Top | |
| 4,926,973 A * | 5/1990 | Smith | 187/240 |
| 5,960,911 A * | 10/1999 | Guaita et al. | 187/410 |
| 6,113,336 A * | 9/2000 | Chang et al. | 414/281 |
| 8,127,893 B2 * | 3/2012 | Mustalahti et al. | 187/266 |
| 2002/0070080 A1 * | 6/2002 | Nakagaki et al. | 187/266 |
| 2011/0315479 A1 * | 12/2011 | Yoshioka | 182/129 |

FOREIGN PATENT DOCUMENTS

| | | |
|---|---|---|
| JP | 58-131300 U | 9/1983 |
| JP | 3-4189 U | 1/1991 |
| JP | 8-301410 A | 11/1996 |
| JP | 10-291609 A | 11/1998 |
| JP | 11-171484 A | 6/1999 |
| JP | 2001151307 A | 6/2001 |
| JP | 2002-249204 A | 9/2002 |
| JP | 2008144544 A | 6/2008 |

* cited by examiner

VERTICALLY MOVING DEVICE

BACKGROUND OF THE INVENTION

1. Field of the Invention

The present invention relates to a vertically moving device for vertically moving the vertically movable platform using wires.

2. Description of the Related Art

Vertically moving devices operate a spool mechanism for spooling wires to vertically move a vertically movable platform to a predetermined height by adjusting the amount of the wires that are fed out from the spool mechanism. For example, in a vertically moving device described in Patent Document 1, four single-line wires spooled by a spool mechanism are connected to the four corners of a vertically movable platform which is rectangular in plan view. The height of the vertically movable platform is controlled by adjusting the amount of the wires fed out from the spool mechanism.

Patent Document 1: Japanese Patent Application Publication No. H08-301410.

However, in the vertically moving device described in Patent Document 1, only one of the four single-line is sometimes stretched longer than the other three due to changes that occur over time. When that happens, the amount of wire fed out from the spool mechanism is longer for the stretched single-line wire than the amount of wires fed out from one of other three single-line wires. As a result, since the vertically movable platform is suspended and supported by the three remaining single-line wires, the vertically movable platform becomes unstable.

SUMMARY OF THE INVENTION

The present invention was made in view of the above-mentioned problem, and its object is to provide a vertically moving device which can stably suspend the vertically movable platform even when one or more of the wires for suspending the vertically movable platform become stretched.

To attain the above-mentioned object, the characteristic configuration of the vertically moving device in accordance with the present invention is that a spool mechanism for spooling at least two wires that are fed out to form loops and a vertically movable platform suspended by looped portions of the at least two wires fed out from the spool mechanism are provided wherein the vertically movable platform includes at least four wire-guiding rotating bodies over which the looped portions of the wires are run, and in that a looped portion of one of the wires is run over at least two of the wire-guiding rotating bodies, and a looped portion of the other of the wires is run over at least two other of the wire-guiding rotating bodies. In addition, the vertically moving device may be configured to include two downwardly guiding rotating bodies for downwardly guiding the looped portion of the one of the wires toward each of the at least two of the wire-guiding rotating bodies, and additional two downwardly guiding rotating bodies for downwardly guiding the looped portion of the other of the wires toward each of the at least two other of the wire-guiding rotating bodies.

With the above-mentioned characteristic configuration, even if a looped portion of a wire is stretched due to changes that occur over time and if the fed-out amount of the wire from the spool mechanism has become longer than the looped portion of the other wise, there will be no changes in the state where the two wire-guiding rotating bodies are evenly suspended by the looped portion. That is, a vertically moving device can be provided in which each of the looped portions of the wires can suspend and support the vertically movable platform with sufficient stability between the two wire-guiding rotating bodies even when the wire which suspends and supports the vertically movable platform becomes stretched.

Another characteristic configuration of the vertically moving device of the present invention is that a plurality of guide rails which are located in a neighboring area surrounding the vertically movable platform and which are long in a vertical direction, wherein the vertically movable platform includes a plurality of guided portions each of which contacts respective one of the plurality of guide rails, and wherein a vertical movement of the vertically movable platform is guided by the guide rails with the guide rails and the guided portions in contact with one another.

With the above-mentioned characteristic configuration, the vertically movable platform can be vertically moved smoothly by virtue of the fact that the guided portions provided to the vertically movable platform are guided by the guide rails.

Yet another characteristic configuration of the vertically moving device of the present invention is that each guided portion is formed of a cylindrical member with a collar portion provided on a circumference of a side face of the cylindrical member, and that the guided portion rotates and advances on a side face of the guide rail with the guided portion abutting side faces of the guide rail from two different directions through a side face and the collar portion of the guided portion, whereby the vertical movement of the vertically movable work platform is guided by the guide rail while a relative displacement in a horizontal direction between the guided portion and the guide rail is restricted.

With the above-mentioned characteristic configuration, the vertical movement of the vertically movable work platform is guided by the guide rails while a relative displacement in a horizontal direction between the guided portions and the guide rails is restricted. That is, the vertically movable platform can be vertically moved smoothly because it is made difficult for the vertically movable platform to sway when the vertically movable platform is raised or lowered.

Yet another characteristic configuration of the vertically moving device of the present invention is that the vertically movable platform is formed of a long rectangular member in plan view, and that the at least two of the wire-guiding rotating bodies are mounted to one longer side portion of two longer side portions of the long rectangular member which face each other, and that the at least two other of the wire-guiding rotating bodies are mounted to the other longer side portion of the two longer side portions.

With the above-mentioned characteristic configuration, at least two wire-guiding rotating bodies provided to one longer side portion of the two longer side portions of the vertically movable platform are suspended by one of the looped portions, and at least two other of the wire-guiding rotating bodies provided to the other longer side portion of the two longer side portions are suspended by the other of the looped portions. That is, since the two longer side portions of the vertically movable platform can be stabilized, the vertically movable platform is suspended and supported with sufficient stability.

Yet another characteristic configuration of the vertically moving device of the present invention is that the vertically movable platform is installed in a structure having predetermined dimensions in a height direction and a width direction such that the one longer side portion of the vertically movable platform is aligned with the width direction of the structure. In addition, the structure may be an article storage rack having a plurality of storage units which are capable of storing articles and which are arranged in the height direction and the width direction.

With the above-mentioned characteristic configuration, the vertically movable platform can be vertically moved along the structure such as an article storage rack having dimensions of certain size in the height direction and the width direction. That is, people can get on the vertically movable platform to check the structure etc.

DETILED DESCRIPTION THE INVENTION

The vertically moving device in accordance with the present invention is described next with reference to the drawings.

Figure 1:
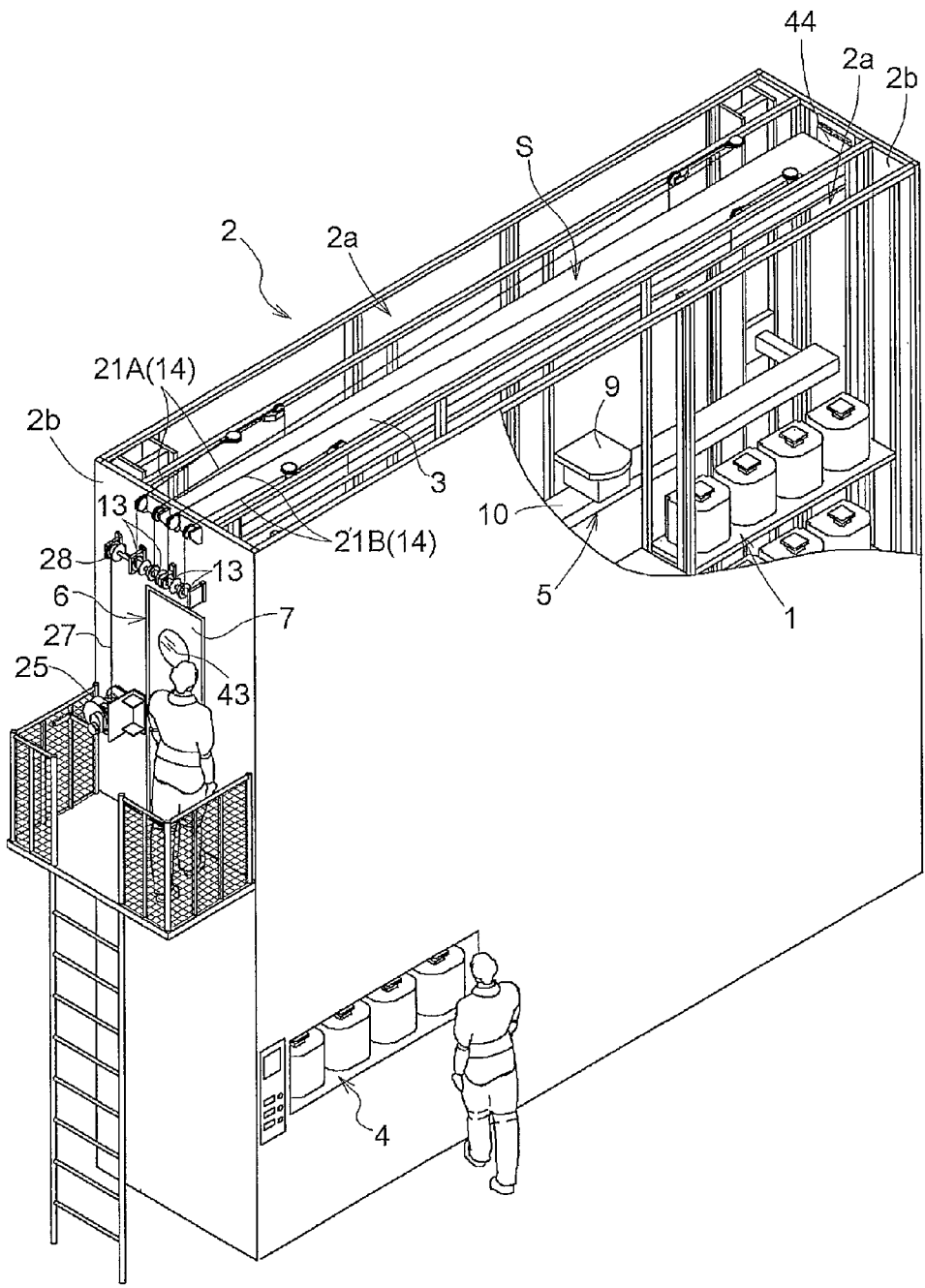
FIG. 1 is a perspective view of the article storage facility.
Figure 2:
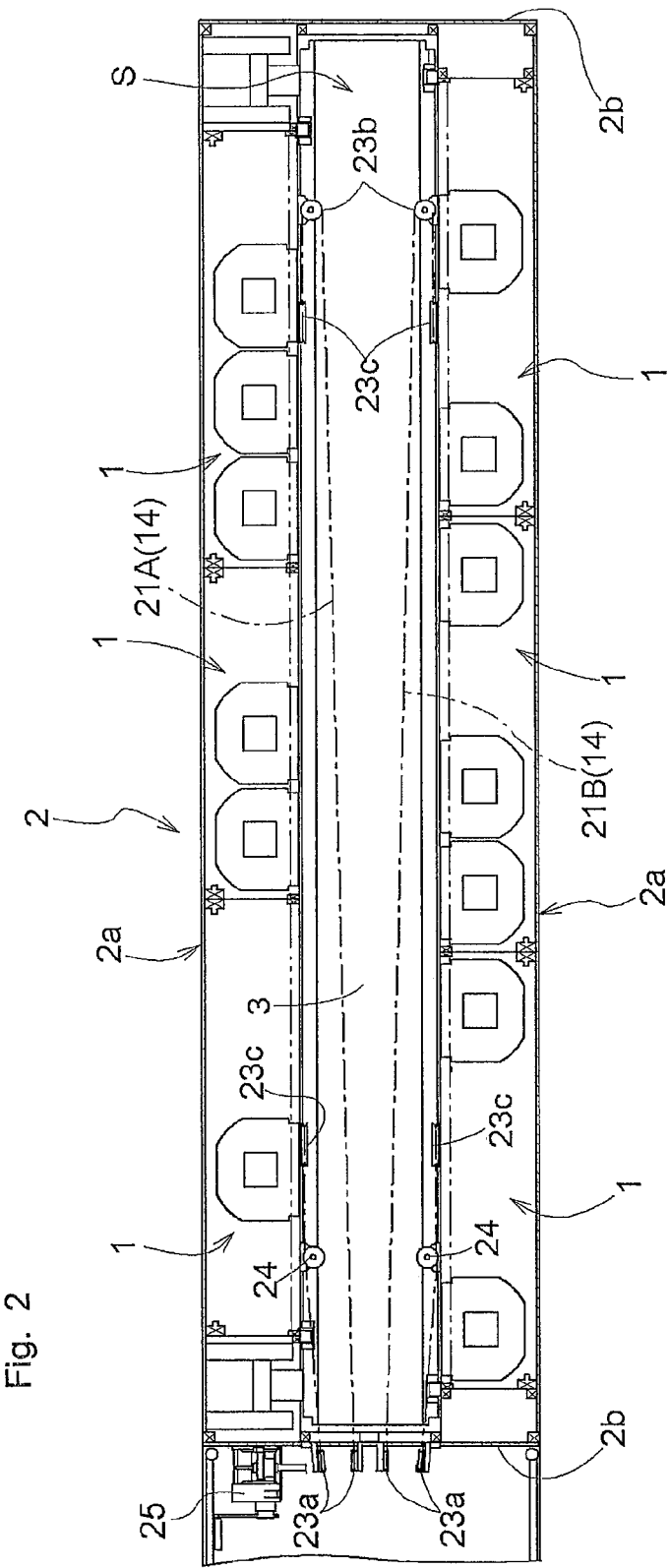
FIG. 2 is a plan view showing an upper portion of the article storage rack.

FIG. 1 is a perspective view of an article storage facility, and FIG. 2 is a plan view showing an upper portion of an article storage rack. As shown in FIGS. 1 and 2, the article storage facility includes an article storage rack 2, a vertically movable work platform 3, a transport device 5, and a vertically moving device. The article storage rack 2 is a structure which has predetermined dimensions in the vertical or height direction and in a horizontal or width direction, and includes a pair of storage rack portions 2a which face each other. The travel space S, described later, is defined between this pair of storage rack portions 2a. The article storage rack 2 has a plurality of storage units 1 which can store articles and which are arranged in the height direction and the width direction. And, the article storage rack 2a includes a plurality of article carrying-in-and-out portions 4 which utilize the storage units 1 located at lower positions in one of the storage rack portions 2a and which are arranged in the rack lateral width direction. The vertically movable work platform 3 which functions as a vertically movable platform is raised and lowered by the vertically moving device in the travel space S in the rack vertical direction. The transport device 5 transports articles between the storage units 1 and the article take-in-and-out portions 4 of the article storage rack 2.

As shown in FIG. 1, the article storage rack 2 is provided with an entrance 6 for allowing people to enter the travel space S and a maintenance door 7 for opening and closing the entrance 6. A pair of outer walls 2b are provided to cover both lateral sides of the article storage rack 2, that is, to cover both sides in the rack lateral width direction of the travel space S located between the pair of storage rack portions 2a. And the entrance 6 which leads to the travel space S is formed in one of the outer walls 2b. Therefore, one can get on and off the vertically movable work platform 3 provided in the travel space S using the entrance 6. The maintenance door 7 is configured to open and close the entrance 6 by a pivot operation about a vertical axis.

The transport device 5 includes an article transfer device 9 and the vertical movement frame 10. The article transfer device 9 transfers articles between each storage unit 1 and itself. More specifically, the article transfer device 9 includes a fork mechanism which can rotate about a vertical axis and thus is capable of transferring articles between either of the pair of the storage rack portions 2a and itself. The vertical movement frame 10 supports the article transfer device 9 for movement in the rack lateral width direction, and can be raised and lowered in the travel space S along the rack vertical direction.

Figure 3:
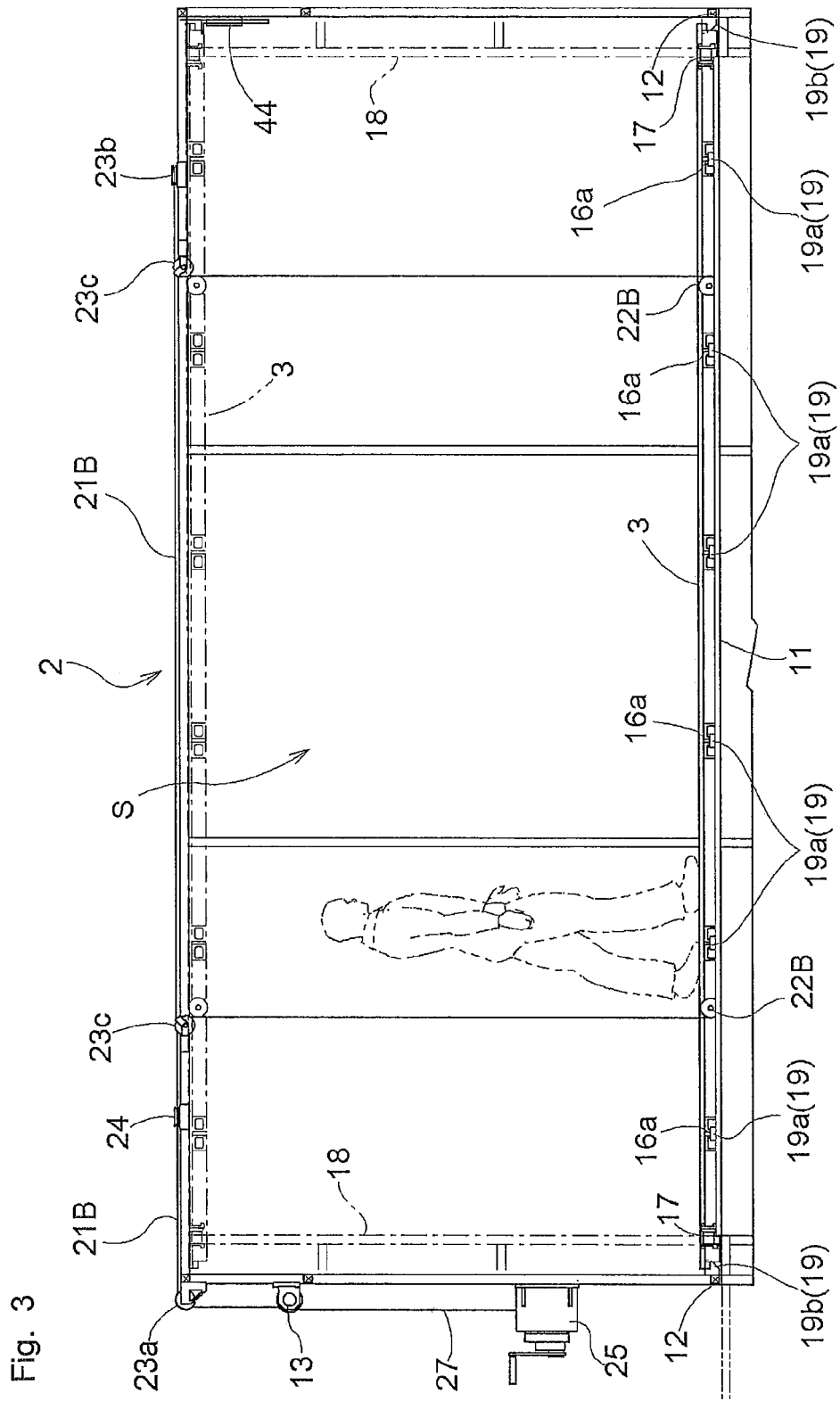
FIG. 3 is a side view of the article storage rack.
Figure 4:
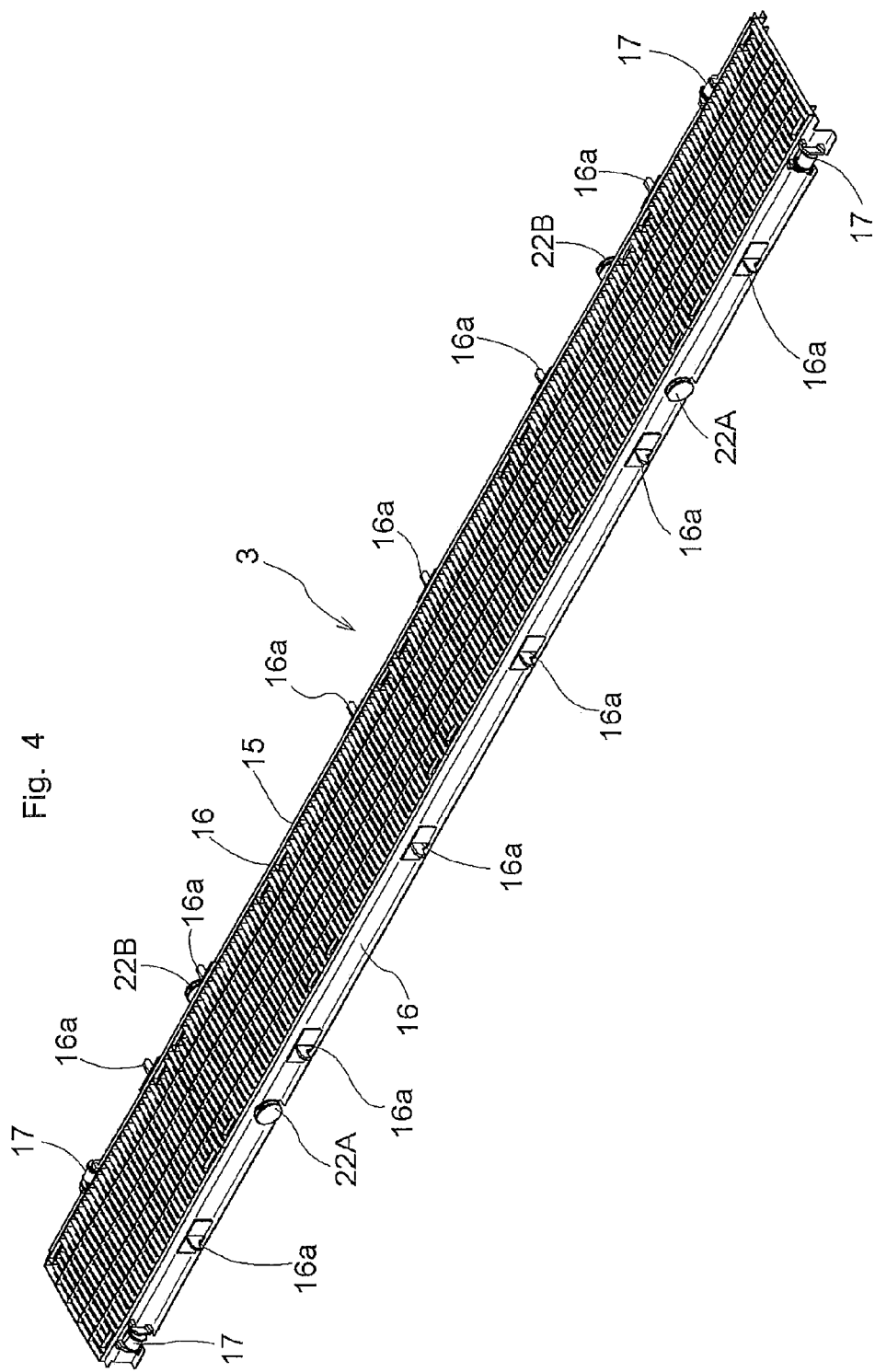
FIG. 4 is a perspective view of the vertically movable work platform.
Figure 5:
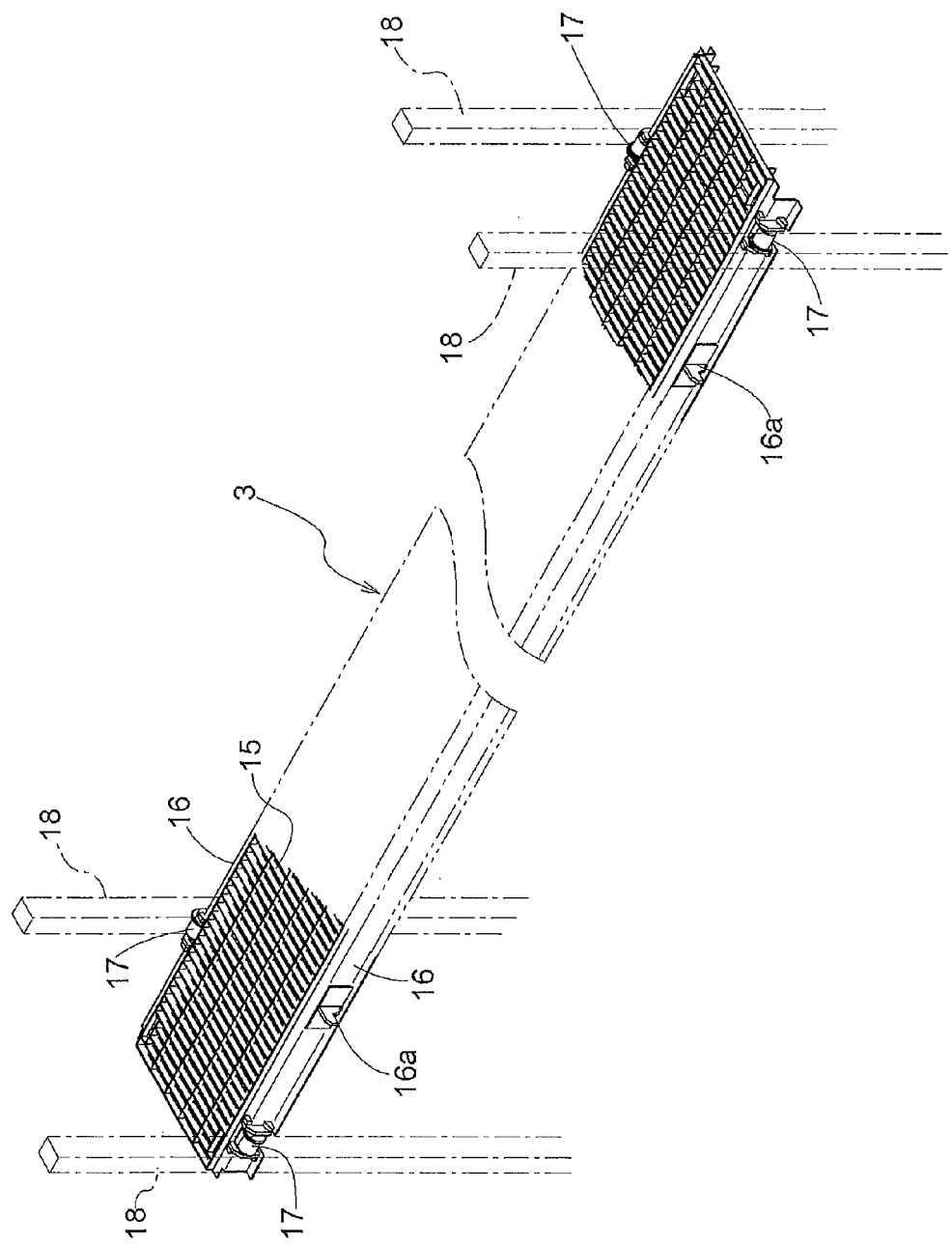
FIG. 5 is a perspective view showing guide rails and guide rollers of the vertically movable work platform.

FIG. 3 is a side view of the article storage rack, FIG. 4 is a perspective view of the vertically movable work platform, and FIG. 5 is a perspective view showing guide rails and guide rollers of the vertically movable work platform.

The vertically movable work platform 3 includes a work platform portion 15 that is a member which is rectangular and long in plan view, and a supported frame portion 16 connected to each of both ends of this work platform portion 15 in the rack fore and aft direction. That is, the vertically movable work platform 3 is formed to be long in the rack lateral width direction. And each of the work platform portions 15 and the pair of the supported frame portions 16 has approximately the same length as the width of the travel space S in the rack lateral width direction.

The vertically movable work platform 3 is suspended and supported at two or more locations by a plurality of suspension wires 14 fed out from the spool mechanism 13, which can be rotated in a forward direction and a reverse direction. And the vertically movable work platform 3 is raised or lowered in the vertical direction of the article storage rack 2 as the spool mechanism 13 is rotated in the forward or the reverse direction. The vertical movement range of the vertically movable work platform 3 spans between a height at an upper end location (or "retreat height" as it is referred to in the following description) or close to the upper end location of the travel space S in the vertical direction of the rack, and a height at an intermediate location (or "work height" as it is referred to in the following description) of the travel space S in the vertical direction of the rack.

As shown in FIGS. 3-5, the vertically moving device includes guide rails 18 which restrict horizontal movements of guide rollers 17 acting as guide portions provided to the vertically movable work platform 3, and which guide the guide rollers 17 along the vertical direction. In other words, the vertically moving device includes a plurality of guide rails 18 which are located in the periphery of—or in an neighboring area surrounding—the vertically movable work platform 3 and which are long along the vertical direction. In the present embodiment, four guide rails 18 are located such as to surround the vertically movable work platform 3. The vertically movable work platform 3 has a plurality of guide rollers 17 each of which functions as a guided portion that contact respective one of the plurality of guide rails 18. The vertical movement of the vertically movable work platform 3 is guided by the guide rails 18 with the guide rails 18 and the guide rollers 17 in contact with each other. That is, the four guide rails 18 abut the guide rollers 17 such as to or as if to clamp the vertically movable work platform 3 and the guide rollers 17 from outside.

To describe in more detail, the guide rollers 17 are provided to each of the pair of supported frame portions 16 of the vertically movable work platform 3 at both end portions in the rack lateral width direction with the guide rollers 17 projecting outwardly in the rack fore and aft direction from the supported frame portions 16. Each guide roller 17 is formed of a cylindrical member. A rib 17a is provided to the circumference of each side face of the cylinder as a collar portion. The guide rails 18 are provided to each of the storage rack portions 2a in the article storage rack 2 at locations that correspond to the guide rollers 17, so as to extend in the vertical direction. The cross-sectional shape in the horizontal direction of the guide rail 18 is rectangular.

And each guide roller 17 abuts against the side faces of the guide rail 18 from two different directions through the side face of the guide roller 17 and the ribs 17a of the guide roller 17 while the guide roller 17 rotates and advances on a side face of the guide rail 18. Thus, the vertical movement of the vertically movable work platform 3 is guided by the guide rail 18 while the relative displacement in the horizontal direction between the guide roller 17 and the guide rail 18 is restricted. The side face of the guide roller 17 is in contact with one side face of the guide rail 18 whereas the ribs 17a of the guide roller 17 is in contact with other side faces of the guide rail 18. That is, the ribs 17a function to restrict movements in the rack lateral width direction.

Figure 6:
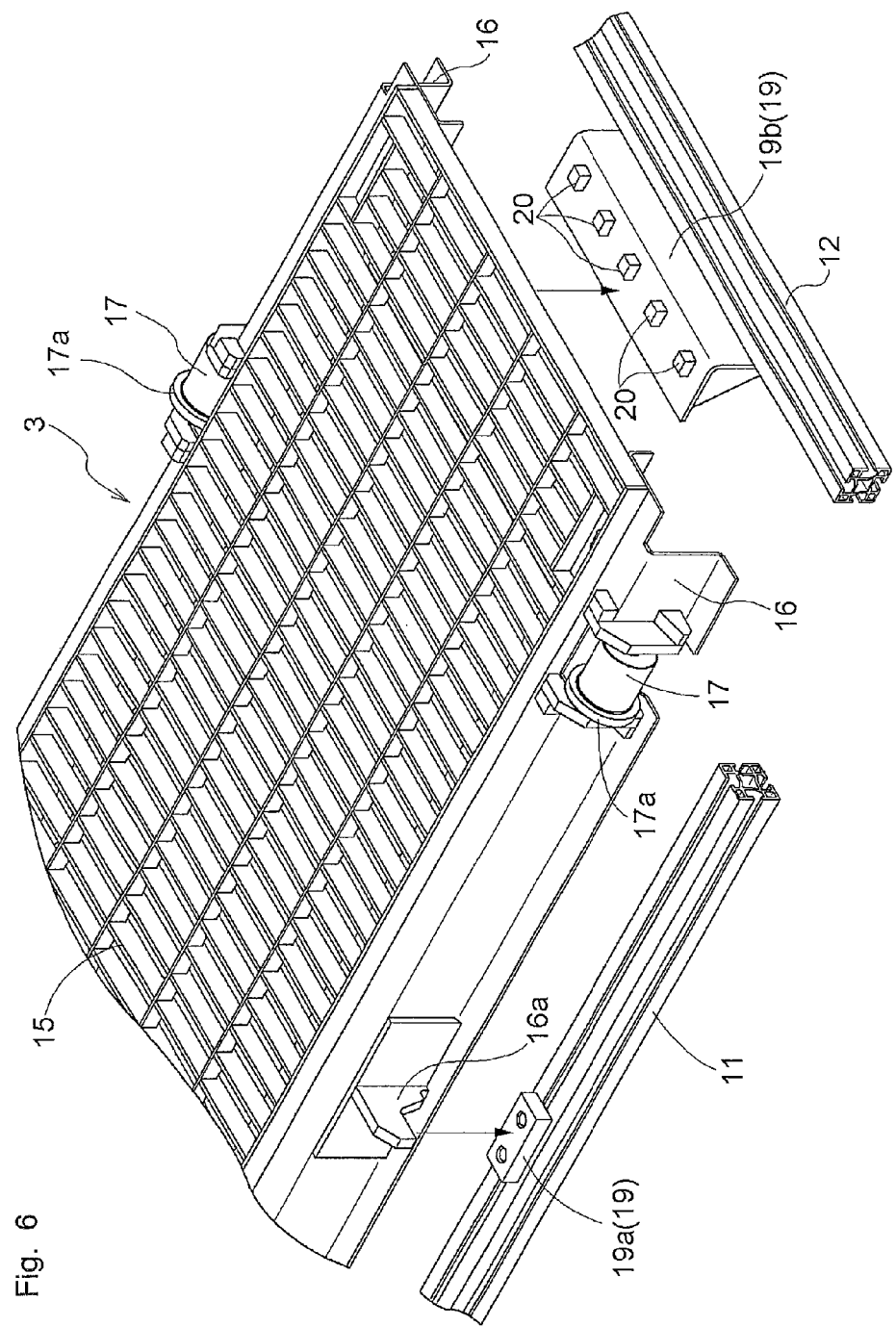
FIG. 6 is a perspective view showing an intermediate portion support and an end portion support.
Figure 7:
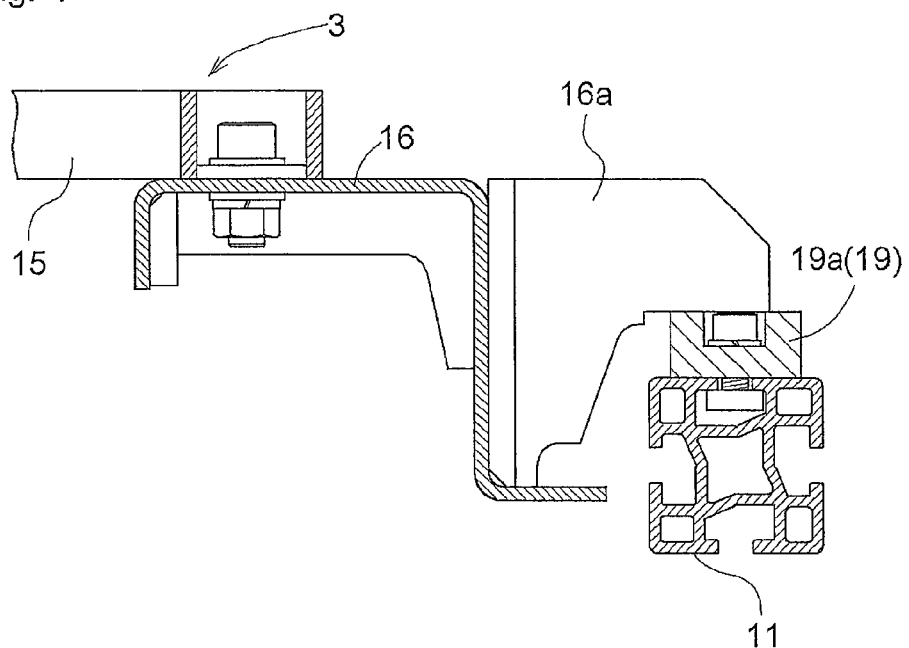
FIG. 7 is a vertical sectional elevational view showing the intermediate portion support.
Figure 8:
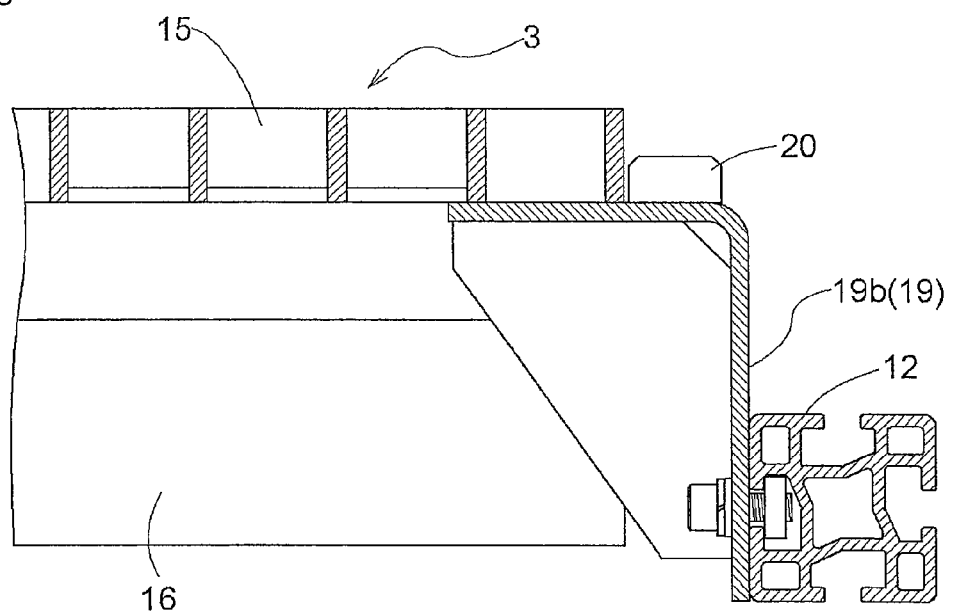
FIG. 8 is a vertical sectional side view showing the end portion support.

FIG. 6 is a perspective view showing an intermediate portion support and an end portion support, FIG. 7 is a vertical sectional elevational view showing the intermediate portion support, and FIG. 8 is a vertical sectional side view showing the end portion support.

As shown in FIG. 6, supports 19 which receive and support, at the work height, the vertically movable work platform 3 which is being lowered are provided in the article storage rack 2.

And provided as the supports 19 are intermediate portion supports 19b which receive and support the intermediate portions in the rack lateral width direction of the supported frame portions 16, and end portion supports 19a which receive and support the end portions in the rack lateral width direction of the supported frame portions 16.

As shown in FIGS. 6 and 7, the intermediate portion support 19a is a block-shaped member fixedly attached to the transverse frame 11 extending in the rack lateral width direction. The intermediate portion support 19a is configured to support a plate-shaped member 16a provided to the supported frame portion 16 such that the plate-shaped member 16a projects outwardly from this supported frame portion 16 in the rack fore and aft direction. And, as shown in FIGS. 6 and 8, each of the end portion supports 19b is a plate-shaped member formed by bending it into an L-shape, and is fixedly attached to the fore and aft frame 12 extending in the rack fore-and-aft direction. The end portion supports 19b are configured to received and supported the ends, with respect to the rack lateral width direction, of the work platform portion 15. The upwardly projecting protruding portions 20 provided to each end portion support 19b abuts the end portion, in the rack lateral width direction, of the work platform portion 15 to prevent the vertically movable work platform 3 located at the work height from moving in the rack lateral width direction.

Incidentally, each of the supports 19 is provided in the area outside, in horizontal directions, of the vertical travel path of the transport device 5 so that it does not interfere with the transport device 5 as it moves vertically.

Figure 9:
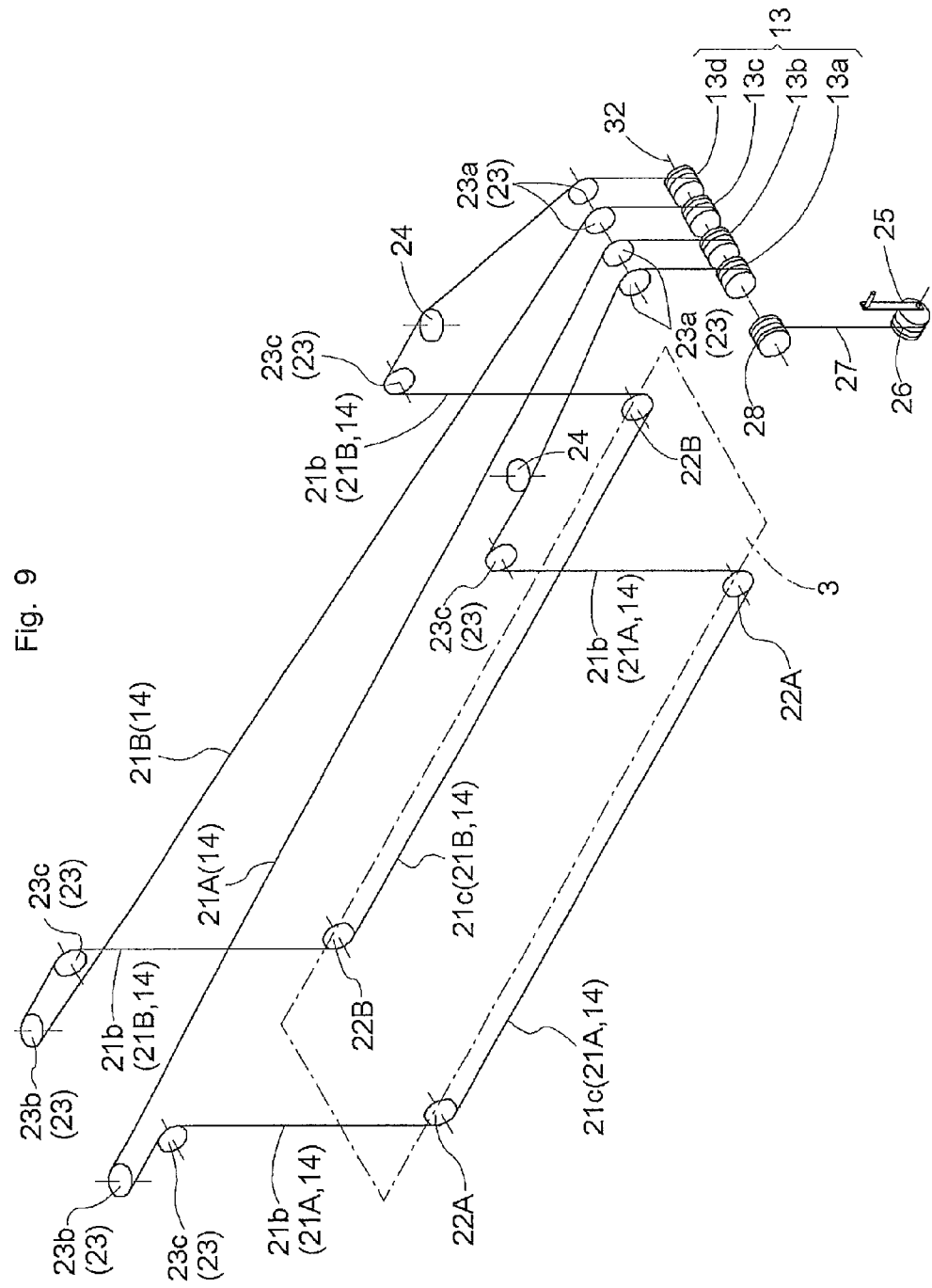
FIG. 9 is a perspective view showing how the suspension wires are arranged.

The relationship between the vertically movable work platform 3 and the suspension wires 14 which suspends the platform 3 is described next. FIG. 9 is a perspective view showing how the suspension wires are arranged.

As shown in FIG. 9, the spool mechanisms 13 spools the two suspension wires 14 such that they are fed out to form loops. And the vertically movable work platform 3 is suspended by the looped portions 21A and 21B of the two suspension wires 14 fed out from the spool mechanism 13. The vertically movable work platform 3 has four wire-guiding rotating bodies 22A and 22B over which the looped portions 21A and 21B of the suspension wires 14 are run. More specifically, the looped portion 21A of the one suspension wire 14 is run over the two wire-guiding rotating bodies 22A, and the looped portion 21B of the other suspension wire 14 is run over the other two wire-guiding rotating bodies 22B.

The two wire-guiding rotating bodies 22A are mounted to one of the two longer side portions of the vertically movable work platform 3 that face each other and the two wire-guiding rotating bodies 22B are mounted to the other of the two longer side portions. The two wire-guiding rotating bodies 22A are spaced as far apart as possible, and are preferably located close to respective ends of one of the longer side portions. Similarly, the two wire-guiding rotating bodies 22B are spaced as far apart as possible, and are preferably located close to respective ends of the other of the longer side portions.

In other words, the looped portion 21A of the suspension wire 14 is fed out from the spool mechanism 13 such as to have a pair of downwardly oriented portions 21b and a horizontally oriented portion 21c which connects the lower end portions of the pair of downwardly oriented portions 21b. And, the looped portion 21B of the suspension wire 14 is fed out from the spool mechanism 13 such as to have a pair of downwardly oriented portions 21b and a horizontally oriented portion 21c which connects the lower end portions of the pair of downwardly oriented portions 21b.

Incidentally, the vertically extending portion that extends between the downwardly guiding rotating body 23c and the wire-guiding rotating body 22A over which the looped portion 21A is run corresponds to the downwardly oriented portion 21b. And the portion extending in the rack lateral width direction and located between the pair of wire-guiding rotating bodies 22A over which the looped portion 21A is run corresponds to the horizontally oriented portion 21c. Similarly, the vertically extending portion that extends between the downwardly guiding rotating body 23c and the wire-guiding rotating body 22B over which the looped portion 21B is run corresponds to the downwardly oriented portion 21b. And the portion extending in the rack lateral width direction and located between the pair of wire-guiding rotating bodies 22B over which the looped portion 21B is run corresponds to the horizontally oriented portion 21c.

And, a plurality of guiding rotating bodies 23 for guiding the looped portions 21A and 21B are provided in the upper end portion of the article storage rack 2. The plurality of guiding rotating bodies 23 consist of horizontally guiding rotating bodies 23a, turning around rotating bodies 23b, and the downwardly guiding rotating bodies 23c. The horizontally guiding rotating bodies 23a are provided on the same side as the spool mechanism 13 in the rack lateral width direction, and guide the looped portions 21A and 21B into the horizontal direction immediately after these portions having been fed out upwardly from the spool mechanism 13. The turning around rotating bodies 23b are provided on the opposite side of where the spool mechanism 13 is provided in the rack lateral width direction, and guide the looped portions 21A and 21B such as to turn them around toward the opposite direction. The downwardly guiding rotating bodies 23c are provided between the horizontally guiding rotating bodies 23a and the turning around rotating bodies 23b, and guide the looped portions 21A and 21B toward the downward direction. And two sets of the five guiding rotating bodies 23 consisting of the horizontally guiding rotating bodies 23a, the turning around rotating body 23b, and the downwardly guiding rotating bodies 23c are provided to one and the other of the longer side portions of the vertically movable work platform 3 (that is to one side and the other side in the rack lateral width direction in the upper end portion of the article storage rack 2).

And, tensioning rotating bodies 24 for providing tension to the looped portions 21A, 21B are provided on one side and the other side in the upper end portion of the article storage rack 2.

Figure 10:
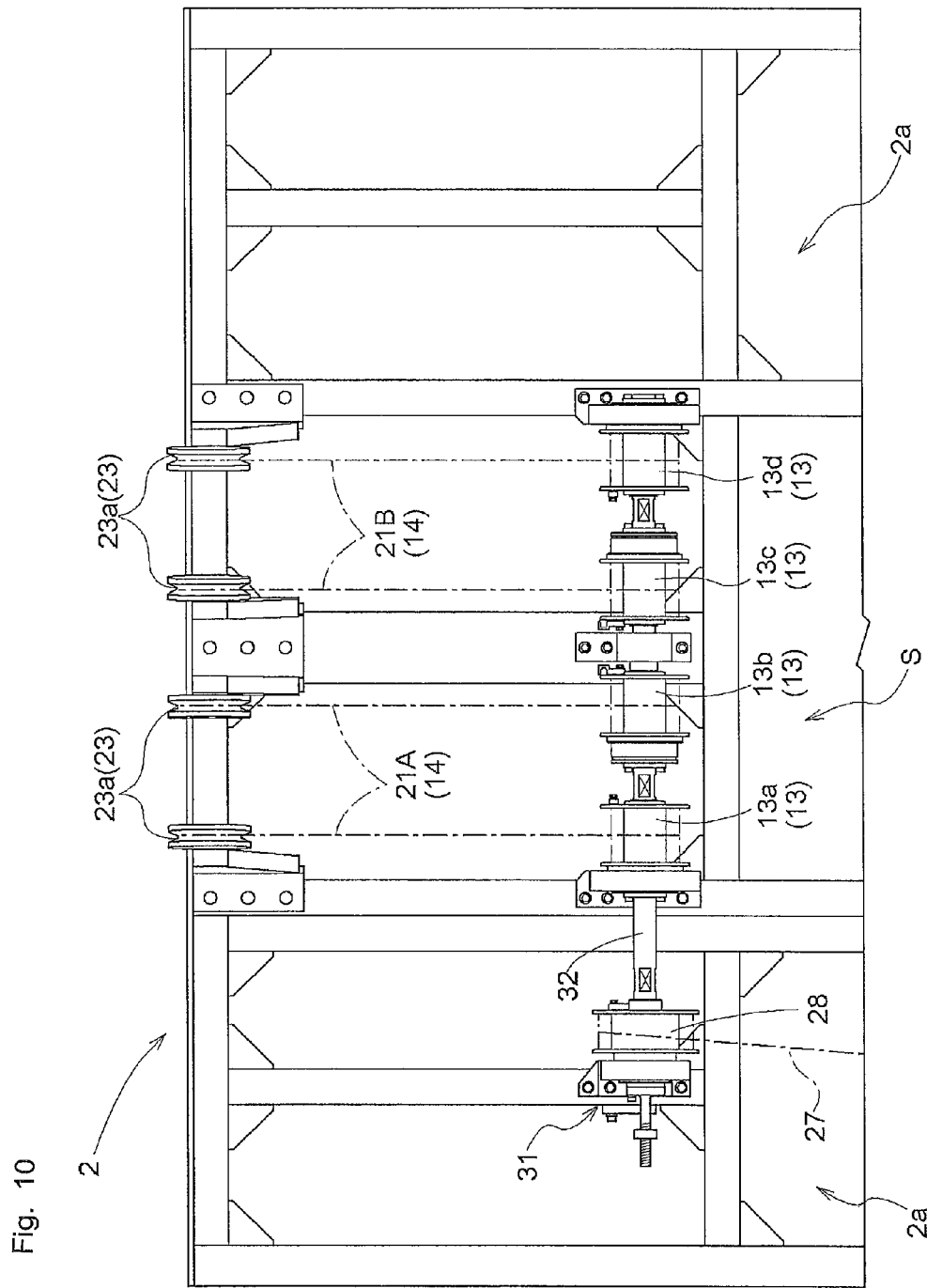
FIG. 10 shows the structure of the spool mechanism.

The configuration of the spool mechanisms 13 is described next. FIG. 10 shows the configuration of the spool mechanism.

As shown in FIGS. 1, 9, and 10, the spool mechanism 13 is provided at a location above the entrance 6 in the article storage rack 2. Provided as the spool mechanism 13 are four spool mechanisms 13 which include a spool mechanism 13a that spools one end of one of the looped portions 21A, a spool mechanism 13b that spools the other end of the one of the looped portions 21A, a spool mechanism 13c that spools one end of the other of the looped portions 21B, and a spool mechanism 13d that spools the other end of the other of the looped portions 21B, and which are provided at locations above the entrance 6 on an external surface of the outer wall 2b of the article storage rack 2 such that the spool mechanisms 13 are arranged in the rack fore-and-aft direction.

And although detailed explanation is omitted, the four spool mechanisms 13 are operatively connected by a pivot shaft 32, as shown in FIG. 10, so that they can rotate in unison. Each of the four spool mechanisms 13 is configured to be capable of being rotated independently by releasing the coupling with the pivot shaft 32.

Located laterally of the entrance 6 of the article storage rack 2 is a winch 25 that is operatively connected to the spool mechanism 13 and that functions as a manually operated operating member for rotating the spool mechanism 13. A rotating operation rotating body 28 is provided for spooling an operating wire 27 fed out from a rotating body 26 of the manually operated winch 25. The spool mechanism 13 is configured to rotate in unison with the rotating operation rotating body 28, and thereby, the winch 25 is operatively connected with the spool mechanism 13. The rotating operation rotating body 28 is provided on the external surface of the outer wall 2b of the article storage rack 2 at a location to one side and above the entrance 6.

That is, when the operator operates the winch 25 to spool the operating wire 27 with the rotating body 26, the rotating operation rotating body 28 is rotated to feed out the operating wire 27. The spool mechanism 13 is rotated to spool the suspension wires 14 in association with this rotation. And the vertically movable work platform 3 is pulled up by the suspension wires 14 and, thus, is raised as the fed-out amounts of the two looped portions 21A and 21B decrease. And, when the operator operates the winch 25 to feed out the operating wire 27 from the rotating body 26, the rotating operation rotating body 28 is rotated to spool the operating wire 27. The spool mechanism 13 is rotated to feed out the suspension wires 14 in association with this rotation. And the vertically movable work platform 3 is lowered under its own weight as the fed-out amounts of the two looped portions 21A and 21B increase.

Figure 11:
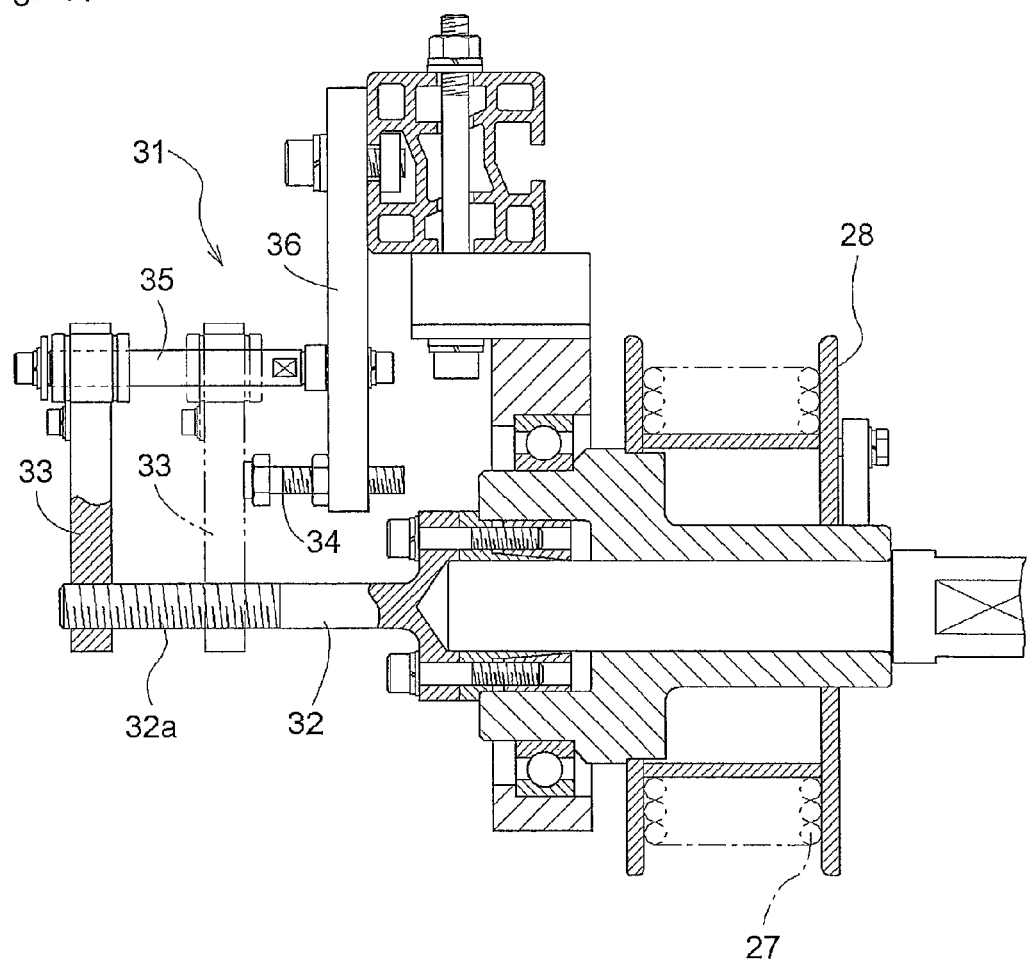
FIG. 11 shows the structure of the stopper means.

FIG. 11 shows the configuration of the stopper means. More specifically, as shown in FIG. 11, stopper means 31 for preventing the rotation of the spool mechanism in such a direction as to lower the vertically movable work platform 3 when the vertically movable work platform 3 reaches the work height is connected to the spool mechanism 13. The stopper means 31 consists of a movable body 33 which meshes with the pivot shaft 32 that rotates in unison with the spool mechanism 13 and which moves in the direction of the axis of the pivot shaft 32 as the spool mechanism 13 rotates, and a receiving body 34 which restricts the moving range of the movable body 33 along the direction of the pivot shaft 32 to the range at which the vertically movable work platform 3 reaches the work height.

The movable body 33 of the stopper means 31 has a proximal end portion which fits onto the pivot shaft 32 extending parallel to a guiding shaft 35 such that the proximal end portion can slide along the axis of the shaft 35 and can rotate, and also has a distal end portion which is meshed with a threaded part 32a in the pivot shaft 32.

And as the pivot shaft 32 rotates with the rotation of the spool mechanism 13, the pivot shaft 32 rotates relative to the movable body 33, and the movable body 33 slides along the direction of the axis of the guiding shaft 35. And the sliding movement of the movable body 33 is restricted when the receiving body 34 contacts an intermediate portion of the movable body 33. As a result, any further rotation of the spool mechanism 13 in the direction which tends to lower the vertically movable work platform 3 is restricted.

The state in which the movable body 33 contacts the receiving body 34 corresponds to the state in which the vertically movable work platform 3 has moved to the location corresponding to the work height. And, the receiving body 34 is configured to have a screw portion which meshes with a supporting plate 36, and thus the receiving body 34 is configured to be moved along the direction of the axis by rotating it. Therefore, the position of the receiving body 34 is adjusted so that the receiving body 34 can receive and restrict the movement of the movable body 33 when the vertically movable work platform 3 is lowered to the work height even if the suspension wires 14 stretch.

Figure 12:
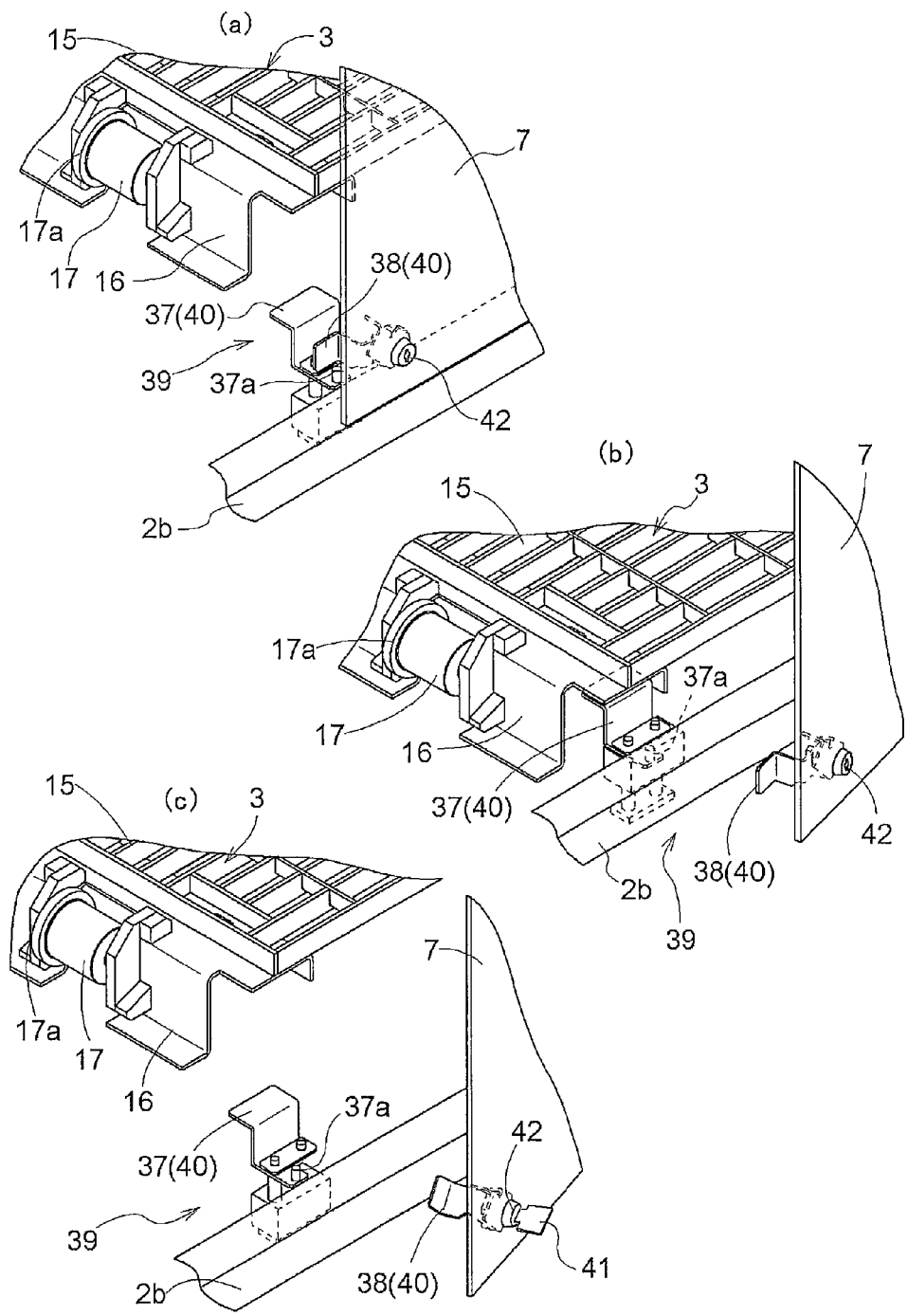
FIGS. 12(a)-12(c) shows the structure of the door opening prevention means.

The configuration of door opening prevention means 39 for preventing opening of the maintenance door 7 is described next. FIG. 12 shows the configuration of the door opening prevention means. The door opening prevention means 39 is provided for allowing the maintenance door 7 to be opened when the vertically movable work platform 3 is located at the work height or a height close to it, and for preventing the maintenance door 7 from being opened when the vertically movable work platform 3 is located above the work height or the height close to it. More specifically, the door opening prevention means 39 consists of a preventing body 40 having a pivot operation member 38 provided on the inside face the maintenance door 7 or more specifically at the lower end of a lateral free end of the inside face and having a vertical movement operation member 37 provided on the outer wall 2b such that it can engage the vertical movement operation member 37. The pivoted orientation or attitude of the pivot operation member 38 can be changed by the operator rotating an operating key 41, which functions as a manually operating element, removably provided to an insert portion 42 which is connected to the pivot operation member 38 and which faces the exterior of the travel space S.

FIG. 12 (a) shows where the door opening prevention means 39 (the preventing body 40) is in the preventing attitude in which the maintenance door 7 is prevented from being opened. FIGS. 12 (b) and 12 (c) show when the door opening prevention means 39 (the preventing body 40) is in the permitting attitude in which the maintenance door 7 is allowed to be opened.

The vertical movement operation member 37, which functions as the preventing body 40, is located in an intermediate location of the vertical travel path of the vertically movable work platform 3, and is elastically urged toward the preventing attitude. Therefore, as the vertically movable work platform 3 is lowered to the work height or a height close to it, the vertical movement operation member 37 is pressed downwardly by the lowering movement of the vertically movable work platform 3 toward the permitting attitude. On the other hand, as the vertically movable work platform 3 is raised above the work height or a height close to it, the vertical movement operation member 37 is released from the pressing force from the vertically movable work platform 3 and is elastically returned toward the permitting attitude.

And, if the attitude of the pivot operation member 38, as the preventing body 40, is switched to the emergency release attitude as shown in FIG. 12 (c) using the operating key 41, the door opening prevention means 39 is switched to the release attitude so that the maintenance door 7 can be opened even if the vertical movement operation member 37 is in the preventing attitude.

That is, the preventing body 40 is configured to be capable of being switched to an emergency release attitude as shown in FIG. 12 (c) which can be effected by manipulating the operating key 41, in addition to the usual release attitude to which the preventing body 40 is switched by the lowering movement of the vertically movable work platform 3 as shown in FIG. 12 (b).

And the pivot operation member 38 may be pivoted between a horizontal engage attitude, shown in FIGS. 12(a) and 12(b), in which the operating key 41 may be inserted to and removed from the insert portion 42, and an engage release attitude in which the pivot operation member 38 is tilted such that its distal end portion is located above its proximal end portion as shown in FIG. 12(c), and in which the operating key 41 inserted into the insert portion 42 may not be pulled out or disengaged. This pivoting of the pivot operation member 38 is performed by the operating keys 41 which has been inserted into the insert portion 42.

In addition, the vertical movement operation member 37 may be moved vertically between a lower position, shown in FIG. 12(b), which the vertical movement operation member 37 reaches as the result of being pressed down by the supported frame portion 16 of the vertically movable work platform 3 against the elastic urging force, and an upper position, shown in FIGS. 12(a) and 12(c), which the vertical movement operation member 37 reaches as the result of being raised by the elastic urging force after being released from the pressing-down force from the supported frame portion 16 of the vertically movable work platform 3. This vertical movement of the vertical movement operation member 37 is effected by the vertical movement of the vertically movable work platform 3.

In addition, the vertical movement operation member 37 has a projection 37a. The projection 37a is located below the lower free end portion of the pivot operation member 38 in the engage attitude when the vertical movement operation member 37 is located in the lowered position, and projects upwardly from the main body of the vertical movement operation member 37 and is located above the lower free end portion of the pivot operation member 38 in the engage attitude when the vertical movement operation member 37 is located in the raised position.

Therefore, as shown in FIG. 12 (a), when the vertical movement operation member 37 is located in the upper position and the pivot operation member 38 is switched to the engage attitude, the vertical movement operation member 37 engages the pivot operation member 38. Therefore, the preventing body 40 comes to be in the preventing attitude because the distal end portion of the pivot operation member 38 contacts the projection 37a of the vertical movement operation member 37 even if someone tries to open the maintenance door 7. As a result, the maintenance door 7 cannot be opened.

And, as shown in FIG. 12 (b), when the vertically movable work platform 3 is lowered to the work height or a height close to it, since the vertical movement operation member 37 (the projection 37a) moves to the lowered position, the vertical movement operation member 37 and the pivot operation member 38 do not engage each other, and thus the preventing body 40 is placed in the normal release attitude. As a result, the maintenance door 7 can be opened.

In addition, as shown in FIG. 12 (c), because the pivot operation member 38 moves away from the vertical movement operation member 37 when the operating key 41 is inserted into the insert portion 42 and the pivot operation member 38 is pivoted by this operating key 41 to the engage release attitude, the preventing body 40 is placed in the emergency release attitude. As a result, the maintenance door 7 can be opened.

Figure 13:
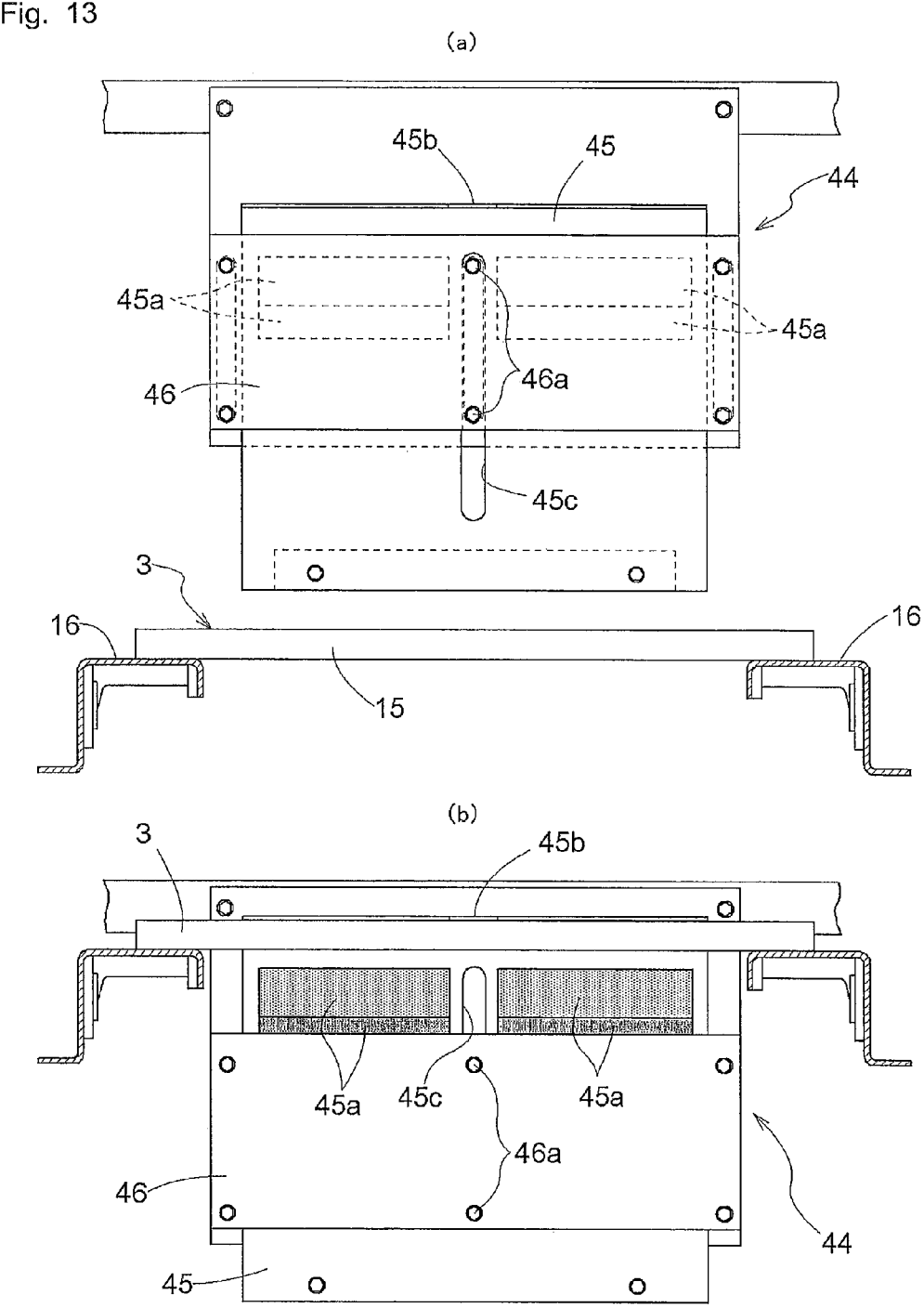
FIGS. 13(a)-13(b) shows a front view showing the display.
Figure 14:
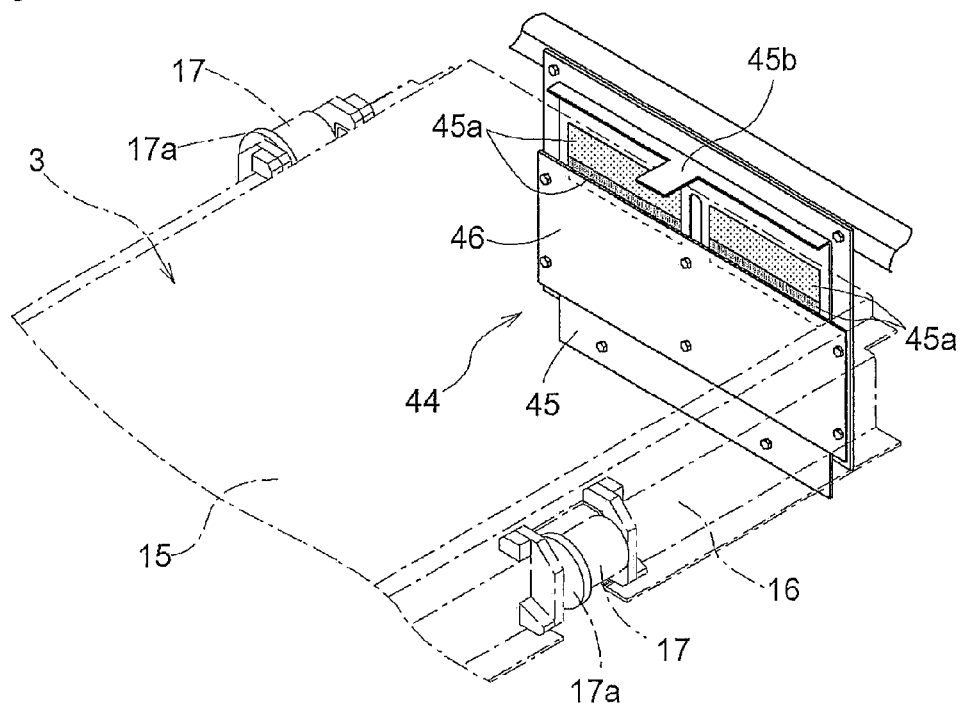
FIG. 14 is a perspective view showing the display.
Figure 15:
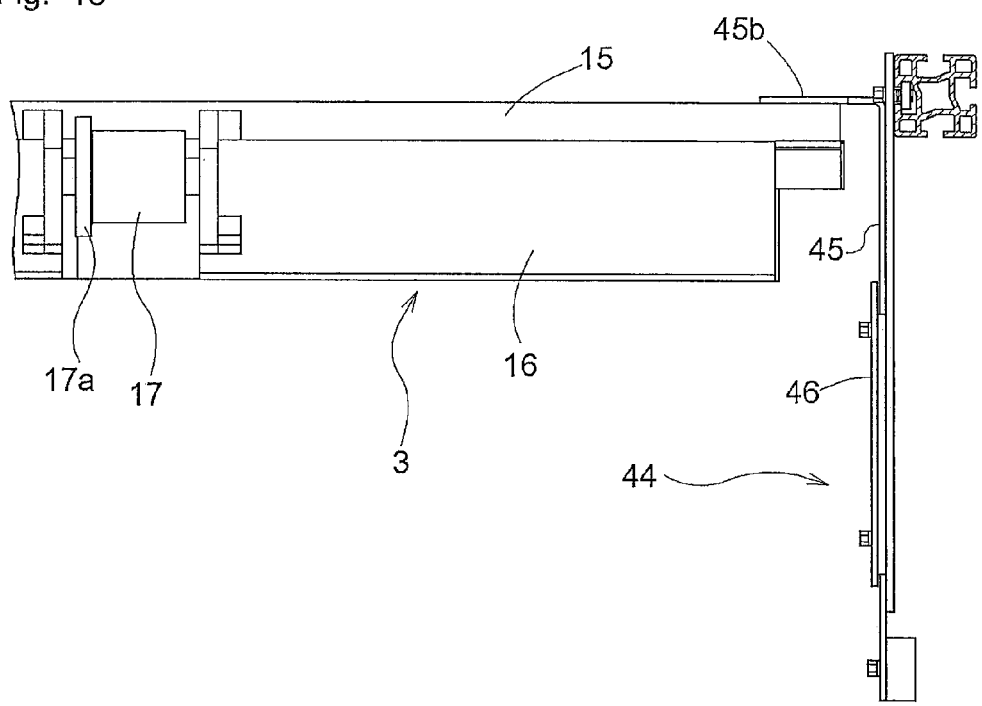
FIG. 15 is a side view showing the display.

The configuration of the arrangement for checking the height of the vertically movable work platform 3 is described next. FIG. 13 is an elevational view of the display portion used to check the height of the vertically movable work platform, FIG. 14 is a perspective view showing the display, and FIG. 15 is a side view showing the display.

As shown in FIGS. 1, and 13-15, a checking window 43 for checking the height of the vertically movable work platform 3 is provided to the maintenance door provided at a position corresponding to one end side of the travel space S in the rack lateral width direction. A display portion 44 for indicating that the vertically movable work platform 3 has been raised to the retreat height is provided at a position corresponding to the other end side of the travel space S in the rack lateral width direction so that the display portion 44 can be visually checked from the checking window 43.

The display portion 44 includes a display body 45 having a colored portion 45a for visual check, and a cover body 46 for covering the colored portion 45a for visual check.

The display body 45 includes the colored portion 45a in the upper portion of a plate-shaped main body portion. In addition, the display body 45 has an engaged portion 45b which is formed in a laterally central portion in the upper end of the plate-shaped main body portion such that it projects horizontally toward where the vertically movable work platform 3 is located. This colored portion 45a for visual check is colored such that it has different sections having different colors along the rack vertical direction of the display body 45. In the present embodiment, the colored portion 45a is divided into strips or bands colored in two different colors with one above the other in the rack vertical direction. The upper portion of the colored portion 45a is colored green, and the lower portion is colored red. They are colored such that the portion colored red in the colored portion 45a has a smaller dimension in the rack vertical direction than the portion colored green.

And the cover body 46 has a pair of—that is, an upper and lower—guide members 46a that extend through a slit-shaped guide hole 45c formed in the display body 45 on the inside at a laterally central location and extending in the vertical direction. The cover body 46 is configured to guide the movement of the display body 45 in the rack vertical direction with the upper and lower pair of guide members 46a, and to support the display body 45 with the upper guide member 46a when the upper guide member 46a is located at the upper end of the guide hole 45c.

And when the display body 45 is supported by the cover body 46 as described above, the entire colored portion 45a in the display body 45 is covered with this cover body 46. The colored portion 45a is exposed above the cover body 46 as the display body 45 moves upwardly relative to the cover body 46, with the upper portion of the colored portion 45a exposed first, followed by the lower portion of the colored portion 45a. The cover body 46 is fixedly attached to the wall portion 2b.

That is, when the vertically movable work platform 3 is located at the work height or a height close to it, the vertically movable work platform 3 does not engage the engaged portion 45b of the display body 45 and thus the display body 45 is not raised. Therefore, the display body 45 is supported by the cover body 46, and the entire colored portion 45a is covered by the cover body 46 in this state.

And, when the vertically movable work platform 3 is raised from the work height or a height close to it and when the vertically movable work platform 3 approaches the retreat height or a height close to it, the vertically movable work platform 3 engages the engaged portion 45b of the display body 45 from below and in the upward direction. As the vertically movable work platform 3 is raised from this state, the upper portion—colored green—of the colored portion 45a is exposed from the upper portion of the cover body 46. And as the vertically movable work platform 3 is raised further, the lower portion—colored red—of the colored portion 45a is exposed from the upper portion of the cover body 46.

[Alternative Embodiments]

(1) In the embodiment described above, a configuration is adapted in which a pair of wire-guiding rotating bodies 22A over which the looped portion 21A is run are provided to one longer side portion of the two longer side portions—of the vertically movable work platform 3—which face each other, while a pair of wire-guiding rotating bodies 22B over which the looped portion 21B is run are provided to the other longer side portion. However, the pair of wire-guiding rotating bodies 22A may be provided to one shorter side portion of the two shorter side portions—of the vertically movable work platform 3—which face each other, while a pair of wire-guiding rotating bodies 22B may be provided to the other shorter side portion.

(2) In the embodiment described above, the movement of the vertically movable platform 3 in the rack fore and aft direction and in the rack lateral width direction was restricted by providing the guide rails 18 for guiding the guided portions 17 provided to the vertically movable platform 3 along the vertical direction. However, the movement of the vertically movable platform 3 in only one of the rack fore and aft direction and the rack lateral width direction may be restricted by providing the guide rails 18. And, it is not necessary to provide the guide rails 18.

(3) In the embodiment described above, the vertically movable work platform 3 is long along the rack lateral width direction. However, the vertically movable work platform 3 may be long in the rack fore and aft direction. Or, the vertically movable work platform 3 may be formed such that its length in the rack lateral width direction is similar to or same as its length in the rack fore and aft direction.

(4) While an example in which the vertically movable work platform is provided to be used with a structure which is the article storage rack in the embodiment described above, the vertically movable work platform may be used with other structure or structures.

(5) In the embodiment described above, the vertically movable work platform 3 as a vertically movable platform is described in the example to have four wire-guiding rotating bodies 22A and 22B. However, the vertically movable work platform 3 may be configured to have more wire-guiding rotating bodies. For example, three wire-guiding rotating bodies in series may be mounted on one longer side portion of the two longer side portions of the vertically movable work platform 3 which face each other, while three additional wire-guiding rotating bodies in series may be mounted on the other longer side portion. In this case, one looped portion of the suspension wire is run over the three wire-guiding rotating bodies arranged in series, while the other looped portion is run over the other three wire-guiding rotating bodies arranged in series.

In addition, the spool mechanism may spool three or more of the suspension wires which are fed out to form loops. For example, when the spool mechanism spools three suspension wires which are fed out to form loops, a configuration may be contemplated in which the vertically movable work platform 3 has six wire-guiding rotating bodies. In this case, the looped portion of one suspension wire is run over two of the wire-guiding rotating bodies. The looped portion of another suspension wire is run over two other wire-guiding rotating bodies. And the looped portion of yet another suspension wire is run over two additional wire-guiding rotating bodies.

The vertically moving device in accordance with the present invention can be used to vertically move the vertically movable platform stably.

The invention claimed is:

1. A vertically moving device comprising:
a spool mechanism for spooling at least two wires that are fed out to form loops; and
a vertically movable work platform suspended by looped portions of the at least two wires fed out from the spool mechanism,
wherein
the vertically movable work platform includes: a scaffold portion having a walking surface for supporting at least one user; and at least four pulleys as wire-guiding rotating bodies over which the looped portions of the wires are run,
wherein a looped portion of one of the wires is run over at least two of the wire-guiding rotating bodies, and a looped portion of the other of the wires is run over at least two other of the wire-guiding rotating bodies;
wherein the vertically movable work platform is formed of a long rectangular member in a plan view, wherein the at least two of the wire-guiding rotating bodies are mounted to one longer side portion of two opposing longer side portions of the long rectangular member, wherein the at least two other of the wire-guiding rotating bodies are mounted to the other longer side portion of the two opposing longer side portions,
wherein the at least two of the wire-guiding rotating bodies and the at least two other of the wire-guiding rotating bodies are mounted only to the two opposing longer side portions,
wherein the at least two of the wire-guiding rotating bodies are mounted apart from each other on the longer side portion, and wherein the at least two other of the wire-guiding rotating bodies are mounted apart from each other on the other longer side portion, wherein the spool mechanism spools the at least two wires connected at both ends to the spool mechanism, and wherein the vertically moving device further comprises:

two downwardly guiding rotating bodies for downwardly guiding the looped portion of the one of the wires toward each of the at least two of the pulleys as wire-guiding rotating bodies;

additional two downwardly guiding rotating bodies for downwardly guiding the looped portion of the other of the wires toward each of the at least two other of the pulleys as wire-guiding rotating bodies; and a plurality of guide rails which are located in a neighboring area surrounding the vertically movable work platform and which are long in a vertical direction, wherein the vertically movable work platform includes a plurality of guided portions each of which contacts respective one of the plurality of guide rails, wherein vertical movement of the vertically movable work platform is guided by the guide rails with the guide rails and the guided portions in contact with one another, wherein each guided portion is formed of a cylindrical member with a collar portion provided on a circumference of a side face of the cylindrical member, wherein the guided portion rotates and advances on a side face of the guide rail with the guided portion abutting side faces of the guide rail from two different directions through the side face of the cylindrical member and the collar portion of the guided portion, whereby the vertical movement of the vertically movable work platform is guided by the guide rail while a relative displacement in a horizontal direction between the guided portion and the guide rail is restricted, wherein the one of the looped portions includes a first pair of downwardly oriented portions downwardly guided by the two downwardly guiding rotating bodies, and a first horizontally oriented portion connecting lower end portions of the first pair of downwardly oriented portions, the first pair of downwardly oriented portions being not overlapped with the vertically movable work platform in the plan view, and the other of the looped portions includes a second pair of downwardly oriented portions downwardly guided by the additional two downwardly guiding rotating bodies, and a second horizontally oriented portion connecting lower end portions of the second pair of downwardly oriented portions, the second pair of downwardly oriented portions being not overlapped with the vertically movable work platform in the plan view, wherein the spool mechanism is formed of four spool mechanisms which include a first spool mechanism configured to spool a first end of one of the looped portions, a second spool mechanism configured to spool a second end of the one of the looped portions, a third spool mechanism configured to spool a first end of the other of the looped portions, and a fourth spool mechanism configured to spool a second end of the other of the looped portions, and the four spool mechanisms are operatively connected by a pivot shaft so that they are rotatable in unison, and wherein the four spool mechanisms are coaxial with the pivot shaft.

2. The vertically moving device as defined in claim 1, wherein the vertically movable work platform is installed in a structure having predetermined dimensions in a height direction and a width direction such that the one longer side portion of the vertically movable work platform is aligned with the width direction of the structure.

3. The vertically moving device as defined in claim 2, wherein the structure is an article storage rack having a plurality of storage units which are capable of storing articles and which are arranged in the height direction and the width direction.

4. The vertically moving device as defined in claim 3, wherein the article storage rack has a pair of storage rack portions, and the vertically movable work platform, with the longer side thereof extending along a rack lateral width direction of the storage rack portion, is raised and lowered in a travel space defined between the pair of storage rack portions.

5. The vertically moving device as defined in claim 4, wherein the plurality of guide rails include four guide rails, each of which is disposed between the article storage rack and the vertically movable platform, at an end portion in the rack lateral width direction of the storage rack.

6. The vertically moving device as defined in claim 1, wherein the at least two of the wire-guiding rotating bodies are mounted with their rotational axes being perpendicular to a side surface forming one longer side portion of the vertically movable work platform and the at least two other of the wire-guiding rotating bodies are mounted with their rotational axes being perpendicular to a side surface forming the other longer side portion.

7. The vertically moving device as defined in claim 1, wherein two of the guided portions are placed on each of the two opposing longer side portions of the vertically movable work platform, and wherein the two of guided portions are mounted apart from each other on each of the longer side portions.

8. The vertically moving device as defined in claim 7, wherein the at least two of the wire-guiding rotating bodies are placed between the two of the guided portions on each of the longer side portions of the vertically movable work platform.

9. The vertically moving device as defined in claim 1, wherein an axis of rotation of the guided portion is parallel with the longer side portion of the vertically movable work platform.

10. A vertically moving device comprising:

a spool mechanism for spooling at least two wires that are fed out to form loops; and a vertically movable work platform suspended by looped portions of the at least two wires fed out from the spool mechanism, wherein the vertically movable work platform includes: a scaffold portion having a walking surface for supporting at least one user; and at least four pulleys as wire-guiding rotating bodies over which the looped portions of the wires are run, wherein a looped portion of one of the wires is run over at least two of the wire-guiding rotating bodies, and a looped portion of the other of the wires is run over at least two other of the wire-guiding rotating bodies;

wherein the vertically movable work platform is formed of a long rectangular member in a plan view, wherein the at least two of the wire-guiding rotating bodies are mounted to one longer side portion of two opposing longer side portions of the long rectangular member, wherein the at least two other of the wire-guiding rotating bodies are mounted to the other longer side portion of the two opposing longer side portions, wherein the at least two of the wire-guiding rotating bodies and the at least two other of the wire-guiding rotating bodies are mounted only to the two opposing longer side portions, wherein the at least two of the wire-guiding rotating bodies are mounted apart from each other on the longer side portion, and wherein the at least two other of the wire-guiding rotating bodies are mounted apart from each other on the other longer side portion, wherein the spool mechanism spools the at least two wires connected at both ends to the spool mechanism, and wherein the vertically moving device further comprises:

two downwardly guiding rotating bodies for downwardly guiding the looped portion of the one of the wires toward each of the at least two of the pulleys as wire-guiding rotating bodies;

additional two downwardly guiding rotating bodies for downwardly guiding the looped portion of the other of the wires toward each of the at least two other of the pulleys as wire-guiding rotating bodies; and a plurality of guide rails which are located in a neighboring area surrounding the vertically movable work platform and which are long in a vertical direction, wherein the vertically movable work platform includes a plurality of guided portions each of which contacts respective one of the plurality of guide rails, wherein vertical movement of the vertically movable work platform is guided by the guide rails with the guide rails and the guided portions in contact with one another, wherein each guided portion is formed of a cylindrical member with a collar portion provided on a circumference of a side face of the cylindrical member, wherein the guided portion rotates and advances on a side face of the guide rail with the guided portion abutting side faces of the guide rail from two different directions through the side face of the cylindrical member and the collar portion of the guided portion, whereby the vertical movement of the vertically movable work platform is guided by the guide rail while a relative displacement in a horizontal direction between the guided portion and the guide rail is restricted, wherein the one of the looped portions includes a first pair of downwardly oriented portions downwardly guided by the two downwardly guiding rotating bodies, and a first horizontally oriented portion connecting lower end portions of the first pair of downwardly oriented portions, the first pair of downwardly oriented portions being not overlapped with the vertically movable work platform in the plan view, and the other of the looped portions includes a second pair of downwardly oriented portions downwardly guided by the additional two downwardly guiding rotating bodies, and a second horizontally oriented portion connecting lower end portions of the second pair of downwardly oriented portions, the second pair of downwardly oriented portions being not overlapped with the vertically movable work platform in the plan view, wherein the spool mechanism is formed of four spool mechanisms which include a first spool mechanism configured to spool a first end of one of the looped portions, a second spool mechanism configured to spool a second end of the one of the looped portions, a third spool mechanism configured to spool a first end of the other of the looped portions, and a fourth spool mechanism configured to spool a second end of the other of the looped portions, and the four spool mechanisms are operatively connected by a pivot shaft so that they are rotatable in unison, and wherein an axis of rotation of the guided portion is parallel with the longer side portion of the vertically movable work platform.

\* \* \* \* \*